Figure 3:
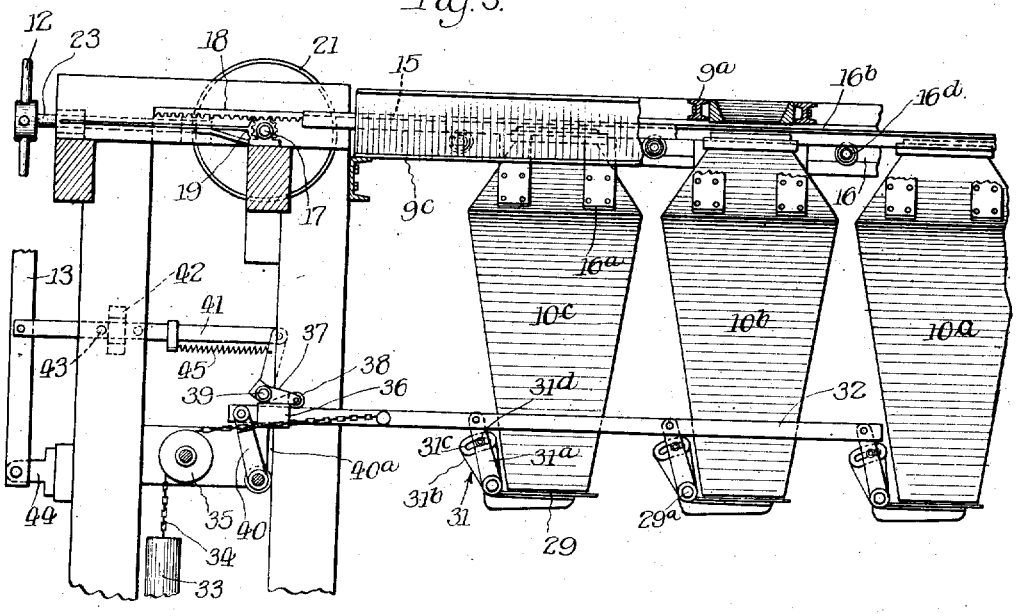

Sept. 30, 1924. Re. 15,921
H. D. PALMER ET AL
APPARATUS FOR MEASURING MATERIALS IN CONCRETE CONSTRUCTION
Original Filed Dec. 5, 1921 4 Sheets-Sheet 1
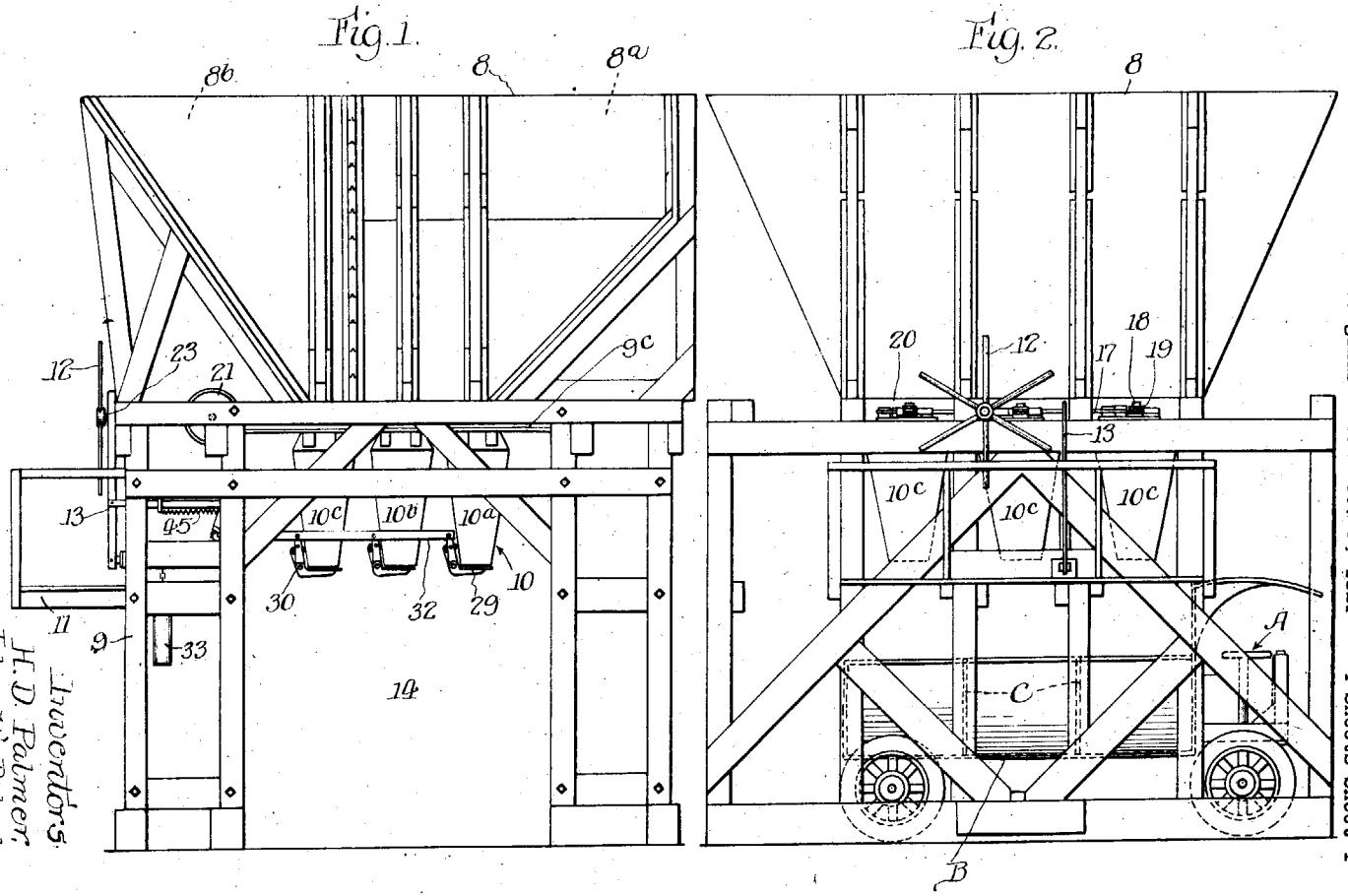
Inventors
H. D. Palmer,
John W. Brhel,
By Shindell, Parker & Barlow
Attys.

Sept. 30, 1924.

H. D. PALMER ET AL

Re. 15,921

APPARATUS FOR MEASURING MATERIALS IN CONCRETE CONSTRUCTION

Original Filed Dec. 5, 1921 4 Sheets-Sheet 2

Inventors:
H. D. Palmer,
John W. Brhel,
By Kindell, Parker & Barton
Attys.

Sept. 30, 1924. H. D. PALMER ET AL Re. 15,921

APPARATUS FOR MEASURING MATERIALS IN CONCRETE CONSTRUCTION

Original Filed Dec. 5, 1921 4 Sheets-Sheet 3

Inventors:
H. D. Palmer,
John W. Brhel,
By Blundell, Parker & Carlson
Attys.

Sept. 30, 1924. H. D. PALMER ET AL Re. 15,921

APPARATUS FOR MEASURING MATERIALS IN CONCRETE CONSTRUCTION

Original Filed Dec. 5, 1921 4 Sheets-Sheet 4

Inventors:
H. D. Palmer,
John W. Brhel,

Reissued Sept. 30, 1924. Re. 15,921

UNITED STATES PATENT OFFICE.

HERMAN D. PALMER AND JOHN W. BRHEL, OF HARTFORD, WISCONSIN, ASSIGNORS TO THE KISSEL MOTOR CAR COMPANY, OF HARTFORD, WISCONSIN, A CORPORATION OF WISCONSIN.

APPARATUS FOR MEASURING MATERIALS IN CONCRETE CONSTRUCTION.

Original No. 1,483,643, dated February 12, 1924, Serial No. 519,896, filed December 5, 1921. Application for reissue filed May 24, 1924. Serial No. 715,747.

*To all whom it may concern:*

Be it known that we, HERMAN D. PALMER and JOHN W. BRHEL, citizens of the United States, both residing at Hartford, in the county of Washington and State of Wisconsin, have invented an Improved Apparatus for Measuring Materials in Concrete Construction, of which the following is a specification.

The invention has particular reference to concrete construction where large quantities of materials are employed, as, for example, in the construction of concrete roads; and the general aim of the invention is to provide an apparatus of an advantageous character by means of which the material, such as sand, gravel or stone, and, if desired, cement, may be accurately measured preliminary and incident to the operation of loading the same into vehicles for transportation to the scene of the building operation.

In a copending application, Serial No. 508,409, filed October 17, 1921, now Patent No. 1,451,106, dated April 10, 1923, there is shown an apparatus of this general character but which is designed for use primarily in connection with bins supported directly upon the ground and usually previously constructed. The present invention has for one object the provision of an apparatus embodying as a part thereof a bin mounted upon a sub-structure through which a vehicle such as a motor truck may pass for the purpose of receiving the discharge of materials from the bin under the control of a single attendant.

By the provision of such an apparatus, not only is the loading operation so simplified as to be capable of control by a single attendant, but the material is measured with a high degree of accuracy and the time necessary to be consumed in the operation is greatly reduced.

An important object of the present invention is to provide an apparatus by means of which the discharge into measuring hoppers of the several materials to be measured, from the respective compartments of the bin containing the same, and also the release of the materials from all or a part of the hoppers simultaneously into a vehicle body stationed beneath them, may be accomplished with maximum ease and efficiency and by a single attendant.

A further object of the invention is to provide a means of advantageous construction for varying the volumetric capacity of the hoppers.

A general object of the invention is to provide an apparatus which is mechanically efficient both from a manufacturing and an operative standpoint.

The objects of the invention thus generally stated, together with other and ancillary advantages, are attained by the construction and arrangement illustrated in the accompanying drawings forming part hereof wherein is illustrated a preferred form of the invention. It is to be understood, however, that the invention is not limited to the precise construction and arrangement herein disclosed, for it will be obvious to those skilled in the art that various changes may be made in form, construction and arrangement of the parts without departing from the spirit and scope of the invention as expressed in the appended claims.

Figure 4:
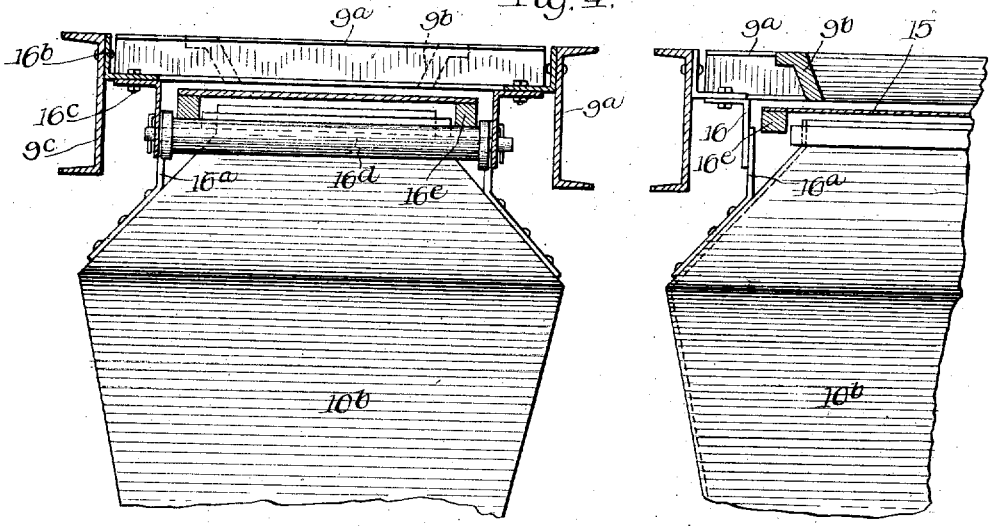
Figure 5:
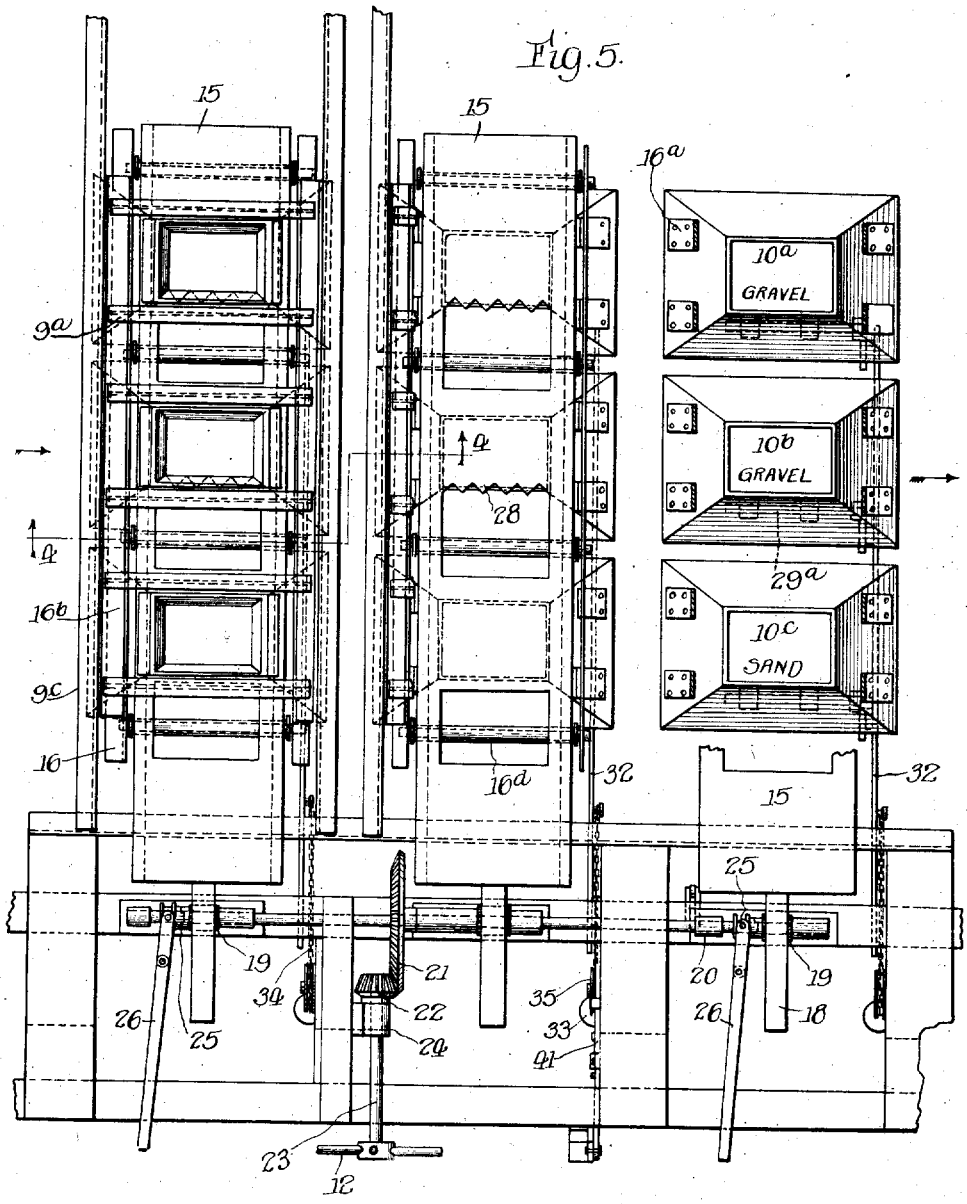
Figure 7:
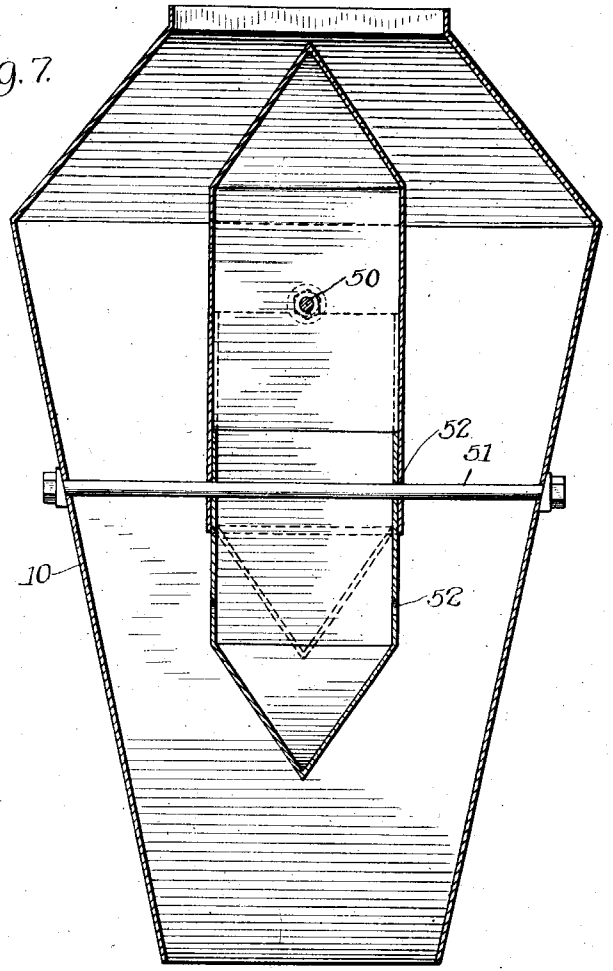
Figure 6:
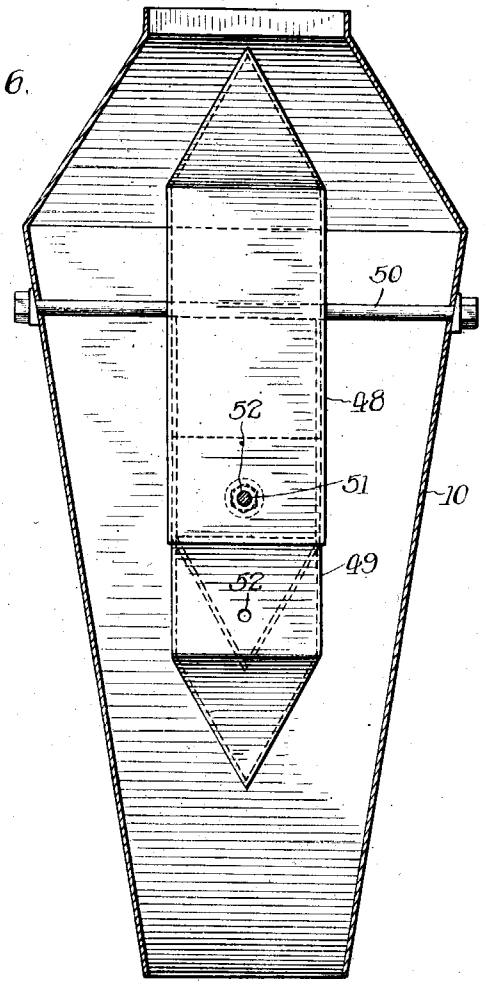

In the drawings, Figure 1 is an end elevation of an apparatus constructed in accordance with our invention. Fig. 2 is a side view of the same showing in broken lines a truck stationed beneath the measuring hoppers. Fig. 3 is a fragmentary end elevation on an enlarged scale of the hoppers and the means for controlling the flow of material thereinto and the discharge of the material therefrom. Fig. 4 is a fragmentary vertical sectional view taken in the plane of line 4—4 of Fig. 5. Fig. 5 is a fragmentary horizontal plan view of the apparatus with the material containing bin removed. Figs. 6 and 7 are vertical sectional views through the hopper looking in directions at right angles to each other and showing the means for varying the volumetric capacity of the hoppers.

The apparatus comprises a bin 8 mounted upon a supporting structure or framework 9 and having a plurality of compartments therein arranged to discharge into hoppers 10. 11 designates a station or platform provided at one side of the supporting structure for the attendant, and within convenient reach of the attendant on said platform is a spider 12 by the operation of which the attendant controls, through suitable valve means, the flow of the material from the various compartments of the bin 8 into the hoppers 10. Also located adjacent said platform is a controlling lever 13 by the operation of which the attendant controls, through the medium of other valve means, the discharge of material from the hoppers into a vehicle stationed therebeneath.

The supporting structure or framework 9 may be of any suitable construction designed to support a heavy load. As shown in Fig. 1, this supporting structure is provided with a central areaway 14 through which a motor truck may pass beneath the hoppers. Preferably the parts of the framework are secured together as by means of bolts. It thus is rendered of a knock-down character so that it may be disassembled and moved from place to place as desired.

The bin 8 is mounted upon the framework 9 in any suitable way, but preferably forming an integral part thereof. Herein the floor of the bin rests upon I-beams $9^a$ carried by the framework and has discharge openings above the hoppers provided with cast liners $9^b$ forming discharge nozzles. This bin is divided to form two compartments $8^a$ and $8^b$ containing gravel and sand, respectively. These compartments are arranged so that they extend throughout the length of the bin and are preferably specially constructed in accordance with the peculiar characteristics of sand and gravel to facilitate the flow thereof.

In the present instance nine hoppers are employed. Six of these hoppers communicate with the gravel compartment of the bin 8 and three with the sand compartment, this proportion being determined by the relative quantities of sand and gravel employed in the mix. As shown in Fig. 5, $10^a$ and $10^b$ designate gravel hoppers and $10^c$ designates sand hoppers. These hoppers are transversely alined and each set or row constitutes a unit which is controlled by a single valve device as hereinafter set forth. The vehicle body into which the materials are to be discharged is provided with three compartments arranged from front to rear of the body, and the hoppers of the several units are arranged to discharge respectively into each of such compartments in the truck body. It will thus be seen that one unit of hoppers is provided for each compartment of the truck body, so that with the vehicle traveling in the direction of the arrows indicated in Fig. 5, a batch of sand and gravel of the proper proportions may be discharged into each compartment of the body.

The discharge openings in the lower ends of the compartments $8^a$ and $8^b$ are normally closed by means of sliding gate valves 15, the upper ends of the hoppers being spaced from the lower end of the bin for the reception of these valves. Referring to Figs. 3 and 4, the means for thus supporting the hoppers in operative relation to the discharge openings of the bin, comprises a frame for each unit which is removably secured to the supporting structure so as to be readily detachable therefrom. This frame comprises a pair of spaced members 16 arranged on opposite sides of the hoppers and secured thereto by means of hangers or brackets $16^a$. These members 16 in turn are secured to rigid angle iron supports $16^b$ by means of bolts $16^c$, which supports are fixed to transversely extending channel beams $9^c$ of the framework. Upon opposite sides of each hopper there are mounted in the angle irons of the frame, rollers $16^d$ upon which the sliding gate valves are mounted. These valves are in the form of elongated plates having a plurality of apertures therein, one for each hopper of the unit, and at their opposite longitudinal edges said plates are provided with longitudinal bearing members $16^e$ (Fig. 4). It will be seen that by the construction set forth, the hoppers, the sliding gates and the supporting rollers for the gates are all carried by the frame members 16, and are therefore capable of being readily detached from the framework by simply removing the bolts $16^c$. This construction is advantageous in view of the fact that it frequently becomes necessary to disassemble the apparatus to facilitate its removal from place to place as occasion requires.

The means for actuating the gate valves 15 comprises a longitudinal shaft 17 operatively connected with the plates on the one hand and with the operating spider 12 on the other hand. Each of the plates has rigid with one end a rack bar 18 with which a spur pinion 19 on the shaft 17 is adapted to mesh. Preferably the teeth on the rack bar are formed on the under side thereof so that the bar rolls over the pinion on the shaft. The latter is provided at spaced intervals throughout its length with bearings 20 secured on the top of the framework. Fast upon the shaft 17 substantially centrally thereof is a bevel gear 21 with which a bevel pinion 22 on the inner end of a shaft 23 is arranged to mesh. 24 designates a bearing for the shaft 23. Upon the outer end of this shaft is secured the spider 12 (Fig. 1).

The pinions for the valves of two of the units, herein the two end units, are loose upon the shaft 17 while the intermediate pinion is fast on said shaft. The loose pinions are adapted to be connected with the shaft by means of splined clutch collars 25 controlled by means of levers 26 pivoted upon brackets 27 and operatively engaging with the collars. It will be seen that by means of these levers, either or both of the end units may be rendered inoperative in the operation of the spider 12 to actuate the intermediate unit. Thus the clutch devices constitute means for selectively actuating the gate valves as may be desired. The reason for this construction is that it frequently becomes necessary to vary the number of batches of material to be conveyed by a single truck. Such variation may be necessitated by reason of the variation in the capabilities or capacities of the trucks employed or because of road conditions over which the material must be hauled.

To facilitate movement of the valves past the gravel hoppers, the openings provided therefor are preferably formed with cutting teeth 28 upon the edge opposed to the movement of the valves in the direction to close the openings at the lower ends of the hoppers. The opening for the finer material, such as sand, requires no such special formation.

The lower ends of the hoppers 10 are normally closed by means of a plurality of hinged gates or trap doors 29 which are fast upon shafts 29ᵃ carried by the individual hoppers adjacent their lower ends and at one side edge thereof. Rigid with each of these shafts is an upstanding arm 31 pivoted at its upper end to a trip bar 32 with one end of which is connected a counterweight 33 through the medium of a chain 34 operating over a pulley 35. The arrangement is such that one trip bar is provided for each unit, so that the arms 31 of the doors for the hoppers of each unit are connected to a common trip bar. The outer end of each trip bar is preferably pivotally supported by an arm 40 pivoted in a bracket 40ᵃ carried by the framework. The counterweight serves to maintain the trap doors of each unit of hoppers closed in the absence of material in the hoppers.

For the purpose of normally maintaining the doors closed when material is discharged into the hoppers through the operation of the sliding gate valves 15, we provide releasable stop devices for the several trip bars 32 operable by means of the single controlling lever 13. This means consists of a stop member 36 carried by each of the bars 32. A bell crank lever 37, carrying a roller 38, is fast upon a shaft 39 which is mounted in the upper ends of the brackets 40ᵃ carried by the framework. Said shaft 39 extends approximately throughout the length of the framework. The bell crank levers 37 are connected with the operating lever 13 by means of a link 41 slidable through a guide plate 42 carried by the framework, and having a limited range of movement as permitted by means of a pair of pins 43 carried by the link and adapted to engage with opposite sides of the bracket. At its lower end the lever is pivotally supported by a bracket 44 carried by the framework. A coiled contractile spring 45 serves to move normally the roller stud 38 into the path of movement of the stop members 36 on the trip bars 32.

When the lever 13 is operated to release the trip bars 32 for movement, it will be seen that only the trip bars of the units which have been filled with material are actuated, since the movement of the trip bars depends upon the actuation of the trap doors controlled thereby. Therefore, when through the operation of the controlling levers 26 either of the two end units is rendered inoperative by reason of the sliding gate valves remaining stationary, the corresponding trip bars and trap doors are held stationary by the action of their counterweights when the releasable stop devices are actuated by the lever 13. Accordingly, only the trap doors for the loaded hoppers are actuated upon the operation of the controlling lever 13.

Upon the operation of the lever 13, the shaft 39 is rotated and the stop devices for each of the bars 32 actuated to permit the descent of the doors 29 and hence the release of the material from the hoppers. Since all of the doors are operatively associated through the medium of the shafts 30, arms 31 and trip bars 32, it will be seen that the release of the material from all of the loaded hoppers is simultaneously effected through an operation of the single lever 13. When the material from the hoppers has been discharged into a vehicle stationed therebeneath, the counterweights 33, suitably proportioned for this purpose act through the bars 32 to restore the doors 29 to their closed position. When thus closed, the locking devices for the bars 32 act automatically to reengage the same for the next hopper-filling operation.

In order to permit of the adjustment of the doors 29 with reference to the trip bars 32, we provide a special construction for the arms 31. Thus each of these arms is of a sectional character comprising a section 31ᵃ loose upon the shaft 30 and a section 31ᵇ fast upon the shaft and having at its upper end an arcuate slot 31ᶜ through which and the section 31ᵃ a bolt 31ᵈ is entered.

As previously stated, the vehicle body is divided into three compartments. In this connection reference is made to Fig. 2 in which is shown a motor truck A stationed beneath the hoppers and having a body B provided with two transverse partitions C.

Obviously it is frequently desirable in the use of apparatus of this character, to vary the proportion of the materials entering into the mix. In order that this may be accomplished conveniently, without necessitating the replacement of the hoppers, we have provided means (Figs. 6 and 7) adapted to vary the volumetric capacities of the hoppers. This means in the present instance comprises a collapsible device consisting of a pair of telescoping members 48 and 49, the upper and lower ends of which respectively are preferably shaped so as not to interfere materially with the flow of material through the hopper. One of the sections, herein the upper section, is stationarily mounted upon a transverse rod 50, the opposite ends of which are mounted in the side walls of the hopper. The lower section in turn is adjustably connected with the upper section and supported in the hopper by means of a longitudinal rod 51 secured in the opposite end walls of the hopper. To provide for the adjustment of the sections with respect to each other, one of the sections, herein the lower section, is provided with a plurality of apertures 52 at vertically spaced intervals. We have shown in broken lines the position of the lower or adjustable section when the capacity of the hopper is decreased.

In the use of our improved apparatus, the materials to be measured and discharged are introduced into the proper compartments of the bin by any suitable conveying mechanism (not shown). Assuming that it has been determined that a batch of material is to be delivered to each of the compartments of the truck body, the attendant, stationed upon the platform 11, manipulates the levers 26 so that all of the valve members 15 are connected with the shaft 17. Then during the period preceding the passage of a vehicle beneath the hoppers, and following the preceding vehicle, if such there has been, the attendant, by the manipulation of the operating spider 12, moves all of the gate valves 15 so that the openings therein are caused to register with the lower ends of the compartments and the upper ends of the hoppers. The hoppers are accordingly filled to capacity, the material flowing from the bins until the hoppers are full. Thereupon the operator closes the lower ends of the bins by returning the gate valves to their initial position. The apparatus is now ready for the discharge of the materials into a vehicle body. This is accomplished almost instantaneously through the operation of the controlling lever 13, all of the doors 29 closing the lower ends of the hoppers being simultaneously released. Immediately upon such discharge of the materials from the hoppers, the counterweights 33 act to restore the doors 29 to their closed position whereupon the locking devices for the trip bars automatically reengage therewith to maintain the doors against downward movement. The operator while waiting for the next vehicle or truck to pass beneath the apparatus now has ample time to fill the hoppers from the compartments of the bin, as previously described, for another loading operation.

In the event that it is desired to discharge batches into one or two of the compartments only of the vehicle, the operator effects this result by manipulating the proper levers 26 so as to render the corresponding gate valves 15 inoperative. Then upon the operation of the lever 13 the trap doors of the loaded hoppers open under the weight of the materials and discharge into the vehicle.

It will be observed that the apparatus which we have thus provided simplifies exceedingly the operation of measuring and discharging the materials to constitute the mix, or any portion thereof, it being obvious that the apparatus may be designed so that any or all of the materials may be handled as desired. Only a single attendant is necessary for the proper control of the apparatus as compared to a relatively great number previously employed for this purpose. At the same time a substantial saving of time is effected, and the measuring is accomplished automatically with a high degree of accuracy as compared to a mere guess on the part of one of the attendants as was formerly the case. Moreover, a substantial saving is effected by eliminating all waste of materials, necessarily excessive with the former method of carrying on this work.

We claim as our invention:

1. An apparatus for measuring and discharging materials in concrete construction having, in combination with a supporting structure, a bin mounted on said structure, a plurality of hoppers carried by said structure and having their upper ends in communication with the bin, valve means between the bin and hoppers adapted to control the flow of materials from the bin into the hoppers, and means adapted to release the materials from the respective hoppers simultaneously into a vehicle body located therebeneath.

2. An apparatus for measuring and discharging materials in concrete construction comprising, in combination, a bin having a plurality of compartments therein, a supporting structure for the bin, a plurality of hoppers carried by said structure having their upper ends adjacent and in direct communication with the discharge ends of said compartments, valve means between said bin and hoppers adapted to control the flow of materials from said compartments into the hoppers, and means for releasing simultaneously the materials from the respective hoppers into a vehicle body located therebeneath.

3. In an apparatus for measuring materials in concrete construction, the combination of a bin, a hopper having its open end communicating with the lower or discharge end of the bin, and a gate valve for controlling the flow of the material from the bin into the hopper comprising a roller-supported plate having an aperture therein, a rack bar rigid with one end of the plate, a shaft geared to said bar, and means for operating said shaft.

4. In an apparatus for measuring materials in concrete construction, the combination of a bin having a plurality of compartments, a plurality of hoppers having their upper ends registering with the lower or discharge ends of the compartments, and a gate valve for controlling the flow of material simultaneously from said compartments into said hoppers, said valve comprising an elongated plate having a plurality of apertures therein, and means for moving said plate.

5. In an apparatus for measuring materials in concrete construction, the combination of an elevated bin, a plurality of measuring hoppers arranged in rows, and means for controlling the flow of material from said bin into said hoppers simultaneously comprising a plurality of sliding valves interposed between the hoppers and the bin, a shaft operatively connected with each of said valves, and means for operating said shaft.

6. In an apparatus for measuring materials in concrete construction, the combination of an elevated bin, a plurality of hoppers arranged in rows and having open ends registering with the discharge end of the bin, valve means entered between the hoppers and the bin comprising a valve member for each row of hoppers, and means for actuating said members simultaneously comprising a shaft operatively connected with each of the members and a second shaft having a gearing connection with the first shaft and extending to one side of the bin.

7. In an apparatus for measuring materials in concrete construction, the combination of a supporting structure, a bin carried by said structure, hoppers arranged in rows and depending from said bin, means for controlling the flow of material from the bin into the hoppers comprising a plurality of transversely slidable valve members, one for each of said rows, a shaft geared to each of said members, and an operating shaft extending to one side of said supporting structure and having its inner end operatively connected with the first mentioned shaft.

8. In an apparatus for measuring materials in concrete construction, the combination with a bin and a hopper beneath the bin, of means for controlling the flow of material from the bin to the hopper comprising a plate having a plurality of spaced apertures therein, rollers for supporting said plate for movement to carry its apertures into and out of register with the adjacent openings in the bin and the hopper, a rack bar rigid with the end of said plate, a shaft having a pinion engaging with said bar, and means for operating said shaft.

9. An apparatus for measuring sand and gravel comprising, in combination, a bin, a plurality of hoppers, said bin having a sand compartment and a gravel compartment, the lower ends of which are each adapted to register with a hopper, and means for controlling the flow of the sand and gravel from said compartments to said hoppers comprising an elongated plate having a plurality of apertures therein, and means for moving said plate, the aperture in the plate for passing the gravel having cutting teeth at one edge thereof.

10. In an apparatus for measuring materials in concrete construction, the combination of a framework, a plurality of hoppers, means for supporting the hoppers in units of a predetermined number comprising a pair of longitudinal supporting members carried by the framework, and a pair of hopper-supporting members detachably secured to the last mentioned hoppers 11. In an apparatus for measuring materials in concrete construction, the combination of a framework, a hopper, a pair of supporting members carried by the framework, a pair of hopper-carrying members secured to said supporting members, a sliding gate valve for controlling the flow of material into the hopper, and a plurality of rollers carried by said hopper-carrying members for supporting said gate valve.

12. In an apparatus for measuring materials in concrete construction, the combination of a hopper, means for controlling the flow of material into the hopper comprising a sliding gate valve, actuating means for said valve means comprising a shaft, a pinion loose on said shaft and having a gearing connection with the valve, a clutch sleeve splined on said shaft and movable into and out of operative engagement with said pinion, and a controlling device for said sleeve.

13. In an apparatus for measuring materials in concrete construction, the combination of a plurality of hoppers, valve devices for controlling the flow of material into said hoppers, there being one of said valve devices for a predetermined number of hoppers constituting a unit, and means for selectively operating said valve devices.

14. In an apparatus for measuring materials in concrete construction, the combination of a plurality of hoppers, valve devices for controlling the flow of material into said hoppers there being one of said valve devices for a predetermined number of hoppers constituting a unit, means for operating said valve devices, and means for controlling the discharge of material from the hoppers, said means being normally operable to close the ends of the hoppers and arranged to be actuated by the weight of the material discharged into the hoppers, the last mentioned means embodying a single controlling lever for the various hoppers.

15. In an apparatus for measuring materials in concrete construction, the combination of a plurality of hoppers, valve devices for controlling the flow of material into said hoppers, there being one of said valve devices for a predetermined number of hoppers constituting a unit, means for operating said valve devices, a plurality of valve devices one for each of the hoppers arranged to control the flow of material therefrom, the valve devices of the several units being operable simultaneously and embodying a plurality of releasable stop devices, and a single lever for actuating all of said stop devices.

16. In an apparatus for measuring materials in concrete construction, the combination of a plurality of hoppers arranged in sets or units, a plurality of valve devices one for each of said units, means for selectively actuating said valve devices, means normally closing the lower end of each of said hoppers, and a releasable stop device one for the hoppers of each of said units.

17. In an apparatus for measuring materials in concrete construction, the combination of a plurality of hoppers arranged in a row, a pair of spaced longitudinal supporting members, each of said hoppers having brackets upon its opposite sides, members detachably securing said brackets to said supporting members, and means for controlling the flow of material into the hoppers slidably mounted with respect to the second mentioned members.

18. In an apparatus for measuring materials in concrete construction, the combination of a plurality of alined hoppers, a pair of longitudinal supporting members spaced apart upon opposite sides of the hoppers, a frame to which said hoppers are detachably secured, said frame being connected to said supporting members, and valve means for controlling the flow of material into said hoppers also carried by said frame.

19. An apparatus for measuring and discharging materials in concrete construction comprising, in combination, a bin, a supporting structure for the bin, a plurality of hoppers supported in said structure and depending in the upper portion thereof, a plurality of valve members for controlling the flow of material from the bin into said hoppers, a plurality of valve members for controlling the flow of material from the hoppers into a vehicle stationed therebeneath, and separate means for operating the two sets of valve members, the operating means for one set of valve members being adapted to actuate them selectively.

20. The combination with a bin divided into compartments, of means for controllably discharging material from said compartments, measuring means receiving the discharge from the respective compartments, said measuring means being separately adjustable to vary the proportions of ingredients from them in a batch, and means separate from said bin-discharging means for controlling the discharge from said measuring means.

21. The combination with a bin divided into compartments, of a common gate controlling the discharge from said compartments, measuring means receiving the discharge from the respective compartments separately adjustable to vary the amount drawn from each compartment, and means for concurrently discharging said measuring means operable independently of said gate.

22. The combination with a bin divided into compartments, of horizontally moving gate means at the bin bottom for discharging material from the compartments, charge measuring containers receiving the discharge from said gate means vertically adjustable in capacity independently of one another, and means at the bottoms of said containers for controlling their discharge.

23. The combination with a bin divided into compartments, of a common discharge gate having separate openings for said compartments, and movable in the line of said openings to open and close, subjacent charge measuring containers receiving the discharge and adjustable in capacity independently of one another, and means at the bottoms of said containers for controlling their discharge.

24. The combination with individual material supply compartments, of discharge control means therefor having actuating mechanism for concurrently discharging material from said compartments, subjacent charge measuring containers receiving the discharge and adjustable in capacity independently of one another, and means separate from the aforesaid discharge controlling means for controlling the discharge from said measuring containers.

In testimony whereof, we have hereunto affixed our signatures.

HERMAN D. PALMER.
JOHN W. BRHEL.